May 19, 1936.    G. S. FROST    2,041,537
PACKAGE
Filed Nov. 16, 1934    2 Sheets-Sheet 1
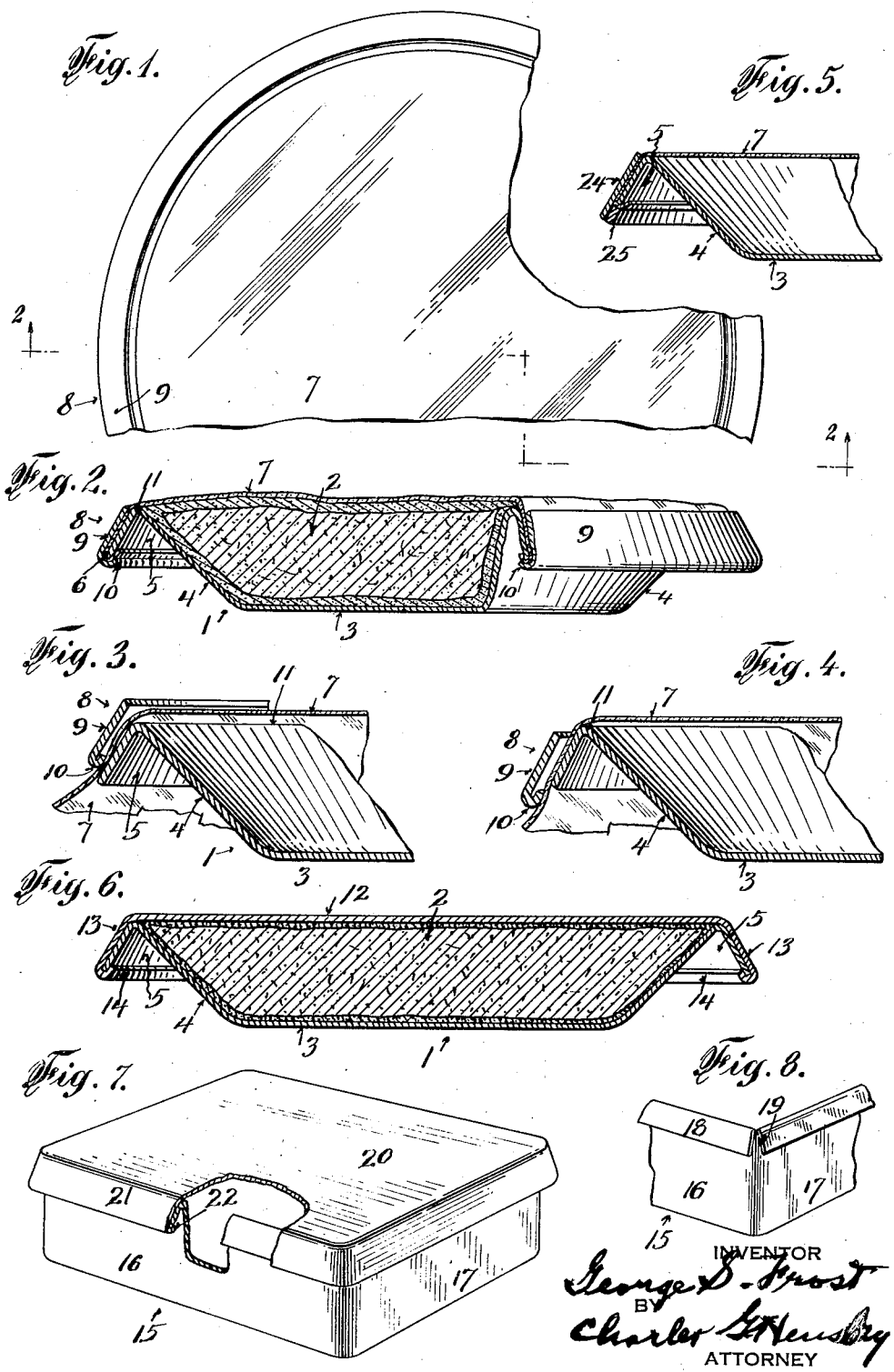

May 19, 1936.　　　G. S. FROST　　　2,041,537
PACKAGE
Filed Nov. 16, 1934　　　2 Sheets-Sheet 2
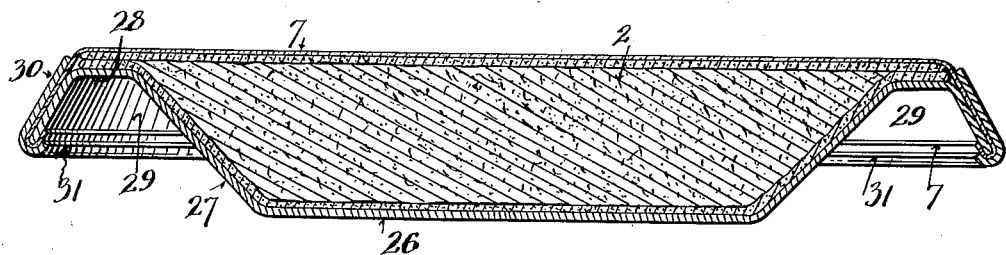
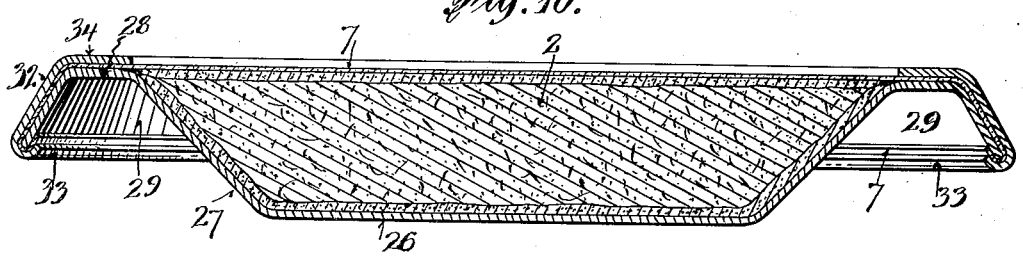
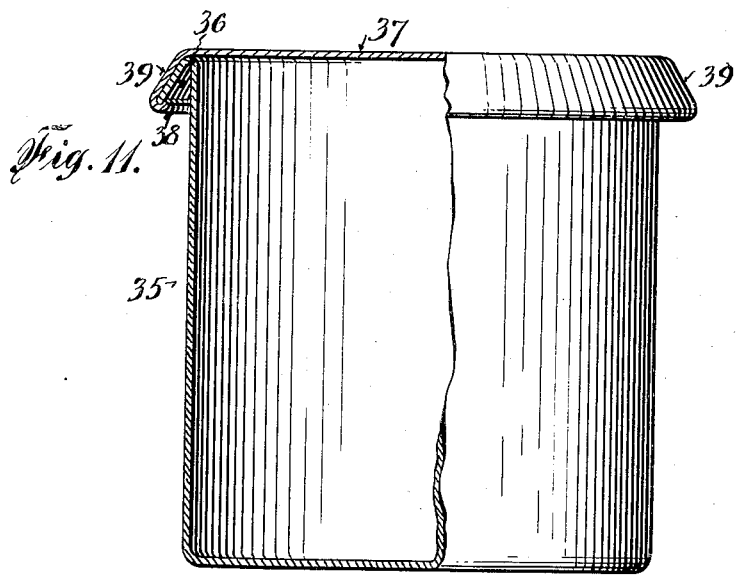
INVENTOR
George S. Frost
BY
Charles G. Hensley
ATTORNEY Patented May 19, 1936

2,041,537

UNITED STATES PATENT OFFICE 2,041,537

PACKAGE

George S. Frost, Baldwin, N. Y.

Application November 16, 1934, Serial No. 753,283

7 Claims. (Cl. 229—45)

My invention relates to packages and it has a broad application to various types of packages. For instance, the invention may be embodied in a package including a pie plate and a cover for holding and protecting pies from the time they leave the bakery until they reach the consumer. In this application of my invention the parts which I shall term broadly "a cover", preferably include a transparent, pliable sheet extending over the top of the pie with the outer or rim portion clamped between a ring member and a flange member on the plate, in the novel manner hereinafter described. If desired, the cover may be all in one piece, in which case the contents of the package will not be visible through the cover.

The invention is also applicable to containers such as are used for holding liquids and semi-liquids. The invention is also applicable to receptacles generally, such as are used for candy boxes, etc.

One of the principal objects of the invention is to provide a receptacle with a self-locking cover. That is to say, the cover may be applied over the top of the receptacle and pressed into place, whereupon the parts of the cover and the receptacle will interlock and thus close the package in a manner to protect the contents. This self-locking feature eliminates the necessity of stitching the parts together and it eliminates the use of machines for closing the package as the operation may be performed very rapidly by hand.

The use of glues and adhesives for securing the cover and receptacle may be entirely eliminated, which is a desirable feature where food products are to be contained in the receptacle. As far as I am aware, this is the first self-locking receptacle and cover which eliminates the use of machinery for closing the package.

Other features and advantages of my invention will be set forth in the following detailed description.

In the drawings forming part of this application,

Figure 1 is a plan view of a portion of a package embodying my invention in one form, Figure 2 is a sectional view taken on the line 2—2 of Figure 1, Figure 3 is an enlarged, sectional view of a portion of a receptacle showing the cover about to be applied, Figure 4 is a similar view at about the time the self-locking feature becomes effective, Figure 5 is a sectional view of a portion of a package showing a modified form of rim for locking on the receptacle, Figure 6 is a sectional view through the middle of a receptacle embodying my invention and in which the cover is made in one piece, Figure 7 is a perspective view of a package, such as a box, with a self-locking cover and embodying my invention, Figure 8 is a perspective view of a corner of the same type of receptacle with the cover omitted, Figure 9 is a sectional view of a modified form of my invention which includes a pie plate having a horizontally disposed top flange as well as the frusto-conical flange, Figure 10 is a similar view of a package in which the clamping ring engages not only the frusto-conical flange but also the horizontal flange of the receptacle, and Figure 11 is a cross-sectional view showing my invention applied to a liquid or semi-liquid container.

I will first describe the form of my invention shown in Figures 1 to 4 inclusive. In this form I have illustrated a pie plate 1 which may be made of pulp, pressed cardboard, or any other material of a relatively stiff nature, and it forms a receptacle for holding a product 2 which may be a pie. The receptacle is shown as consisting of a bottom wall 3, an inclined or frusto-conical wall 4 extending upwardly from the outer edge of the bottom wall; and at the top of the frusto-conical wall 4 there is an outwardly and downwardly extending wall 5 forming a flange which is in itself of frusto conical and annular shape.

Heretofore, receptacles of this character have been provided with flat or horizontal top flanges, whereas in my invention it consists of a frusto-conical flange extending downwardly from the top edge of the receptacle and having a free lower edge 6. In this form of the invention the cover for the receptacle is made in two parts, one of which is a pliable, transparent sheet 7 which may be made of "cellophane", glacine or any of the other transparent or translucent sheets commonly used as closing members for receptacles. This sheet, where the package is of circular form, as shown in Figures 1 to 4, will generally be cut in the form of a circle and of sufficient diameter to extend not only across the contents of the receptacle but downwardly against the outer face of the frusto-conical flange 5 and inwardly and around the lower edge of the latter. The other member of the cover consists of an annular ring 8 the main wall 9 of which is preshaped in frusto-conical form and at its lower edge it is provided with an inturn or fold 10 adapted to interlock with the flange 5 of the receptacle.

In applying the cover to the receptacle, the transparent, pliable sheet 7 is placed across the top of the receptacle and its contents, as shown in Figure 3; and the clamping ring is laid upon the pliable sheet 7 and the flange 5 of the receptacle, and the ring is then pressed downwardly by hand (or by machinery if desired) into the position shown in Figure 4. During this downward pressure of the ring, the flange 5 of the receptacle is pressed inwardly toward the receptacle by the action of the ring, and this reduces the maximum diameter of the flange 5 temporarily until the ring is moved into the position shown in Figure 4. As soon as the inturned portion 10 of the ring passes the lower free edge 6 of the flange 5 of the receptacle, the latter will spring outwardly until the lower edge 6 enters between the inturned part 10 and the wall 9 of the ring, whereupon the parts will be brought to the condition shown in Figures 1 and 2. This operation requires only downward pressure on the ring.

As soon as the parts have been brought to the condition shown in Figure 4, the flange 5 of the receptacle springs outwardly and immediately locks with the ring, so that the locking operation is automatic when the ring has been pressed into position. This automatic action is possible because the flange of the receptacle is made frusto-conical whereby its greatest diameter, that is, the diameter at the free edge 6 may be temporarily reduced by the pressure of the ring, until the infold 10 has passed the free edge of the flange of the receptacle, so that the latter flange may spring back or expand and press against the wall 9 of the ring with the lower free edge 6 of the flange lying between the inturned edge 10 and the frusto-conical wall 9 of the ring.

While the ring is being lowered into position, as above described, the sheet of pliable, transparent material 7 is drawn snugly against the top edge 11 of the receptacle so that when the package has been closed the transparent sheet will be drawn snugly across the top of the receptacle. When the package has been closed in the manner described above it will be in the condition shown in Figure 2 where the frusto-conical ring 8 presses the outer portion of the pliable sheet 7 against the outer surface of the frusto-conical flange 5 and the pliable sheet extends around the free edge 6 and it is held by the inturned portion 10 of the ring. The cover cannot move downwardly because the pliable sheet rests on the top edge 11 of the receptacle and the ring cannot move upwardly because the inturned edge 10 passes around the lower free edge of the frusto-conical flange 5 of the receptacle and the cover is therefore locked in all directions against accidental removal.

The contents of the receptacle are protected against dust and air because of the clamping of the pliable member across the top edge 11 of the receptacle and because of the gripping of the pliable member between the free edge 6 and the inturned portion 10 of the ring so that the package is substantially air- and dust-proof.

While stitching may be passed through the flange 5 and the wall 9 of the ring, if desired, there is no necessity for this because the ring is self-locking on the flange of the receptacle. The lock as between the ring and the flange of the receptacle is such as to permit rough handling of the package without releasing the lock. A package made in accordance with the above description is very neat in appearance and it may be made at a very low cost to permit it to be used for food products and to permit the package to be discarded after a single use.

The package just described is suitable for holding pies and it may be made deeper in order to hold various cakes and other food products.

In Figure 6, I have shown a receptacle similar in all respects to the one just described, and similar reference numerals are applied thereto. In this form of the invention the cover, instead of being made of a pliable sheet and a locking ring, is made of one piece consisting of the top wall 12 adapted to cover the open end of the receptacle. Around the outer portion of this wall there is a depending and frusto-conical wall 13 taking the place of the ring in the first described form of the invention; and at the lower edge of this frusto-conical wall there is an inturned edge or lip 14 which is adapted to encircle and lock against the lower free edge 6 of the frusto-conical wall 5 of the receptacle. This cover is adapted to be applied in the same manner as the one described above, that is to say, the cover is merely pressed downwardly so that the flange 5 of the receptacle is compressed or bent inwardly until the inturned edge 14 of the cover passes the free edge 6, whereupon the wall 5 springs outwardly and its free edge locks between the inturned portion 14 and the wall 13. The ring of the first form of the invention and the cover of the form shown in Figure 6 may be made of pressed fibre, cardboard or any other suitable material. The inturned edge 10 or 14 may be made by pressing the cover member in a die or by turning this edge over in a rolling operation.

In Figure 7, I have shown my invention applied to a rectangular receptacle such as a box for containing candies or any other articles. In this view the receptacle is shown as a body 15 having side and end walls 16, 17, and a bottom, with the top of the receptacle left open. Around the top of the receptacle as shown in Figures 7 and 8 there are outwardly and downwardly turned flaps 18 which are disposed in rectangular order as distinguished from the regular frusto-conical shape shown in Figures 1 to 6.

If desired, a slit 19 may be formed at each of the corners of the receptacle in order to allow the several flanges 18 to bend downwardly as the cover is applied, without buckling the corner portions of the flanges. Preferably, the slit 19 is of such narrow width that the adjacent edges of adjacent flanges 18 will touch just as the cover has reached locking position.

In Figure 7 the cover is shown as consisting of a top wall 20 extending over the open end of the receptacle and with a depending and inclined flange 21 extending around the four sides of the wall 20 and adapted to lie against the flanges 18 of the receptacle. There is an inturned edge 22 extending all around the flange 21 of the cover which is adapted to lock against the lower, free edges of the several flanges 18 of the receptacle. In this case the cover is applied by laying it over the top of the receptacle and pressing it downwardly until it automatically locks with the receptacle. During this downward pressure the flanges 18 are pressed slightly inwardly until the inturned edge 22 of the cover passes the lower free edge of the flanges 18, whereupon the latter spring outwardly and lock between the inturned portions 22 and the flange 21. It will be obvious that a two-part cover such as is shown in Figures 1 to 4 may also be used with the type of package shown in Figures 7 and 8.

In Figure 5 I have shown a receptacle in the form of a plate similar to Figures 1 to 4 and the parts of the plate are similarly numbered. The transparent, pliable sheet 7 is the same as that shown in Figures 1 to 4. In this form of the invention the clamping ring of annular and frusto-conical shape consists of the inclined wall 24 and at its lower free edge there is attached a strip 25 of cardboard or other suitable material to form a shoulder to lock against the free edge 6 of the flange of the plate in the same manner as the infolded portion 10 of the ring in Figures 1 to 4.

The cover in this form of the invention is applied in the same manner as that in Figures 1 to 4.

In Figure 9 I have shown a type of plate used for holding pies and to which my invention has been applied. In this form the plate includes a bottom wall 26, an outwardly extending, frusto-conical wall 27 extending upwardly from the bottom and at the top of the receptacle there is an outwardly extending horizontal flange 28 over which the flange of the pie may extend and against which it may rest. In this form the frusto-conical flange 29 of the receptacle extends outwardly and downwardly from the outer edge of the horizontal wall 28 but in other respects the device is like that shown in Figures 1 to 4. The pliable sheet 7 extends over the food product, over the horizontal wall 28, and thence downwardly over the flange 29. The ring 30 which is like that shown in Figures 1 to 4 presses the outer portion of the pliable sheet against the outer surface of the flange 29 and the inturned edge 31 of the ring locks on the lower edge of the flange 29. The cover in this construction is applied in the same manner as the cover in the form shown in Figures 1 to 4.

In Figure 10 I have shown a modified form of cover ring. In this instance the plate or receptacle is of the same form as shown in Figure 9 and the parts are similarly numbered. The pliable sheet 7 is the same as previously described. However, the clamping ring not only has a frusto-conical wall 32 with the inturned edge 33 to lock against the lower free edge of the flange 5 of the plate, but there is a horizontally extending portion 34 on this ring which lies against the pliable sheet and presses against the horizontal wall 28 of the plate when in the position shown in this figure.

In Figure 11 I have shown a type of receptacle such as are used for holding liquids, such as milk, tea or coffee in liquid form, or jellies, jams and other products, or it may be used to hold products in powdered or dry form if desired.

The container 35 shown in this view is of a cylindrical form and it will be made of cardboard, pressed fibre, metal or any other material. Around the top edge of the receptacle there is formed a downwardly and outwardly extending frusto-conical wall 36 having a free edge like the walls 5 of the previously described containers. The cover may be of two-part or one-piece construction, corresponding with those previously described. In this view I have shown the one-piece cover including a top wall 37 with a depending and frusto-conical flange 39 provided with an inturned edge 38 at its lower edge. This type of cover is applied in the same manner as those described above. That is to say, the cover is placed on the receptacle and is pressed downwardly so that the flange 36 is slightly bent inwardly until the inturned member 38 of the cover passes the lower free edge of the flange 36 of the receptacle, whereupon the flange springs outwardly and the free edge thereof is locked between the inturned member 38 and the wall 39.

Receptacles made to embody my invention may be nested in compact form for shipment to the users of the package.

It is preferable, in order to secure the full advantages of my invention, that the wall 9 of the ring shown in Figures 1 to 4 lie closely against the flange part of the plate when the parts are in the condition shown in Figure 2. The same relation should preferably exist in connection with the other forms of the invention shown and described.

It will be apparent from the above that I have provided a receptacle with a very simple self-locking cover which requires no machine for the operation of applying the cover to the receptacle. Once the cover is locked upon the receptacle, even rough handling will not dislodge the cover from the receptacle. The contents are securely held in the receptacle.

The broad feature of my invention resides in the combination of an outwardly and downwardly extending flange on the receptacle with the free edge at its lower portion, together with a cover member having a downwardly and outwardly inclined flange or ring with an inturned portion at its lower edge adapted to interlock with the free edge of the inclined flange of the receptacle.

While I have shown several forms of my invention in the annexed drawings, I desire to cover all modifications which come within the scope of the appended claims.

Having described my invention, what I claim is:

1. An article of the class described, including a receptacle having an opening and provided with an outwardly and downwardly extending flange at the open end of the receptacle, said flange having a free lower edge and a cover including a downwardly and outwardly extending wall or flange having its lower edge bent inwardly and upwardly to provide a locking member, said locking member adapted to engage with the lower free edge of the flange of the receptacle when the cover is pressed into position upon the receptacle.

2. An article of the class described, including a plate having a bottom wall, an upwardly extending frusto-conical wall, a horizontal flange extending laterally outward from the top of said frusto-conical wall and having a downwardly extending frusto-conical flange of stiff but bendable material extending downwardly from the outer edge of said horizontal flange and provided with a lower free edge, a sheet of pliable material extending across the open side of the receptacle, across said horizontal flange and downwardly across said frusto-conical flange of the receptacle, and a locking ring having a horizontal portion lying against a portion of said pliable sheet and the horizontal flange of said plate, and having a frusto-conical portion extending down the outer side of the frusto-conical flange of the receptacle, said latter portion of the ring having an inturned projection at its bottom free edge, said ring adapted to be pressed downwardly on said frusto-conical flange, said flange adapted to yield inwardly to permit said inturned portion of said ring to pass the free edge of said frusto-conical flange and said inturned projection adapted to interlock with the lower free edge of the frusto-conical flange of the receptacle after passing the same adapted to interlock with the lower free edge of the frusto-conical flange of the receptacle while the cover is pressed into position upon the receptacle.

3. An article of the class described, including a supporting member of stiff material provided with an outwardly and downwardly extending flange extending from its outer edge, said flange being made of stiff but bendable material and having a free lower edge and a cover for said supporting member, including an annular member having a downwardly and outwardly extending wall having an inwardly extending projection around the same, the said cover member adapted to be pressed downwardly on the said flange, said flange being adapted to yield inwardly to permit said inwardly extending projection on the cover to pass the free edge of said flange, and said projection adapted to lock under the free edge of the flange after passing said free edge.

4. An article of the class described, including a supporting member of stiff material having an outwardly and downwardly extending frusto-conical annular flange extending from the outer edge thereof, said flange being made of stiff but bendable material and having a free lower edge and a cover for said supporting member, including a downwardly and outwardly extending frusto-conical wall having an inwardly extending projection around the same, said frusto-conical cover member adapted to be pressed downwardly on said flange, the free portion of said flange adapted to yield inwardly to permit said inwardly extending projection on the cover to pass the free edge of said flange, and said projection adapted to lock under said free edge of the flange after passing said free edge.

5. An article of the class described, including a supporting member of stiff material having an outwardly and downwardly extending frusto-conical annular flange extending from the outer edge thereof, said flange being made of stiff but bendable material and having a free lower edge and a cover for said supporting member, including a downwardly and outwardly extending frusto-conical wall normally parallel with said frusto-conical flange, said wall having an inwardly extending projection around the same, said frusto-conical cover member adapted to be pressed downwardly on said flange, the free portion of said flange adapted to yield inwardly to permit said inwardly extending projection on the cover to pass the free edge of said flange and said projection adapted to lock under the free edge of the flange after passing said free edge.

6. An article of the class described, including a supporting member of stiff material provided with an outwardly and downwardly extending flange extending from its outer edge, said flange being made of stiff but bendable material and having a free lower edge and a cover for said supporting member, including an annular member having a downwardly and outwardly extending wall and a strip secured to the inner side of the lower free edge of said cover member, said cover member adapted to be pressed downwardly on said flange, said flange adapted to yield inwardly to permit said strip on the cover to pass the free edge of said flange and said strip adapted to lock under the free edge of the flange after passing said free edge.

7. An article of the class described, including a receptacle having plane sides and provided with an opening outwardly and downwardly extending flanges on the plane sides of the receptacle, said flanges having free lower edges and being made of stiff but bendable material, a cover for said receptacle including a top and a downwardly and outwardly extending wall around the edges thereof, said wall having an inwardly extending projection at its free edge, said cover member adapted to be pressed downwardly on said flanges, said flanges adapted to yield inwardly to permit said inwardly extending projections on the cover to pass the free edges of said flanges and said projections adapted to lock under said free edges of the flanges after passing the same.

GEORGE S. FROST.